United States Patent [19]

Malloy, III

[11] Patent Number: 5,089,219
[45] Date of Patent: Feb. 18, 1992

[54] GAS COOLED NUCLEAR FUEL ELEMENT

[75] Inventor: John D. Malloy, III, Lynchburg, Va.

[73] Assignee: The Babcock & Wilcox Company, New Orleans, La.

[21] Appl. No.: 643,301

[22] Filed: Jan. 22, 1991

[51] Int. Cl.$^5$ .............................................. G21C 3/30
[52] U.S. Cl. ................................. 376/427; 376/428; 376/455; 376/420
[58] Field of Search ............... 376/433, 418, 428, 436, 376/455, 456, 457, 420, 427; 264/0.5, 2.5

[56] References Cited

U.S. PATENT DOCUMENTS

| | | | |
|---|---|---|---|
| 3,159,911 | 12/1968 | Lloyd | 376/420 |
| 3,801,449 | 4/1974 | Cayol et al. | 376/418 |
| 3,867,253 | 2/1975 | Gratton et al. | 376/352 |
| 3,954,559 | 5/1976 | Oguma et al. | 376/418 |
| 4,004,972 | 1/1977 | Hogard | 376/453 |
| 4,163,689 | 8/1979 | Grossman et al. | 376/321 |
| 4,759,911 | 7/1988 | Bingham et al. | 376/428 |
| 5,015,437 | 5/1991 | Fauske et al. | 376/385 |

*Primary Examiner*—Donald P. Walsh
*Assistant Examiner*—Neena Chelliah
*Attorney, Agent, or Firm*—Robert J. Edwards; D. Neil LaHaye

[57] ABSTRACT

A gas cooled nuclear fuel element. A cylindrical tube having an open lower end contains nuclear fuel disks stacked one upon the other to define an annular space between the tube and disks. An upper and a lower end fitting in the tube support the stack of fuel disks. Each disk has an axial bore or channel for coolant flow. The disks may also be provided with grooves extending radially on the upper or lower face from the axial channel to the outer edge of each disk. The lower end fitting has a central bore that is coaxial with the axial channel in the disks. Coolant flows into the annular space, radially between disks, and then axially out the disks and lower end fitting.

4 Claims, 3 Drawing Sheets

GAS COOLED NUCLEAR FUEL ELEMENT

BACKGROUND OF THE INVENTION

1. Field of the Invention

The present invention is generally related to nuclear reactors and more particularly to high temperature gas cooled reactors and their fuel elements.

2. General Background

In high temperature gas cooled reactors, forms of fuel that have been used include pin type fuel elements, cylindrical particle compacts in hexagonal graphite blocks (prismatic), spherical particle compacts (pebble), and extruded, hexagonal, graphite/fuel rods (NERVA). Reactors using the prismatic or pebble fuel forms utilize carbon as the matrix material binding coated fuel particles together and as the reactor moderator. Use of carbon as the moderator results in fuel elements with limited fuel particle content and very large reactor cores because of the large amount of carbon needed for neutron moderation. Patents directed to fuel elements for gas cooled reactors which applicant is aware of include the following.

U.S. Pat. No. 4,569,820 discloses stackable fuel elements machined from graphite and having fuel chambers that receive nuclear fuel in the form of coated particles. Coolant holes are machined through the graphite blocks separate from the fuel chambers so that the coolant does not directly contact the fuel.

U.S. Pat. No. 4,759,911 discloses a gas cooled nuclear fuel element formed from a plurality of progressively sized rigid porous cylinders nested together that have varying quantities of nuclear fuel deposited thereon.

U.S. Pat. No. 3,560,339 discloses a nuclear reactor fuel element having an elongated tubular cladding which contains fuel particles and a plurality of discs smaller in diameter than the internal diameter of the cladding.

U.S. Pat. No. 4,704,248 discloses a nuclear fuel element formed from an elongate block of refractory material having a plurality of separate coolant passages and elongate fuel holes. End seals insure proper coolant flow through the coolant passages.

U.S. Pat. No. 3,873,420 discloses a fuel element assembly comprising a prismatic block having fuel containing bores and interstitial coolant conducting bores extending end-to-end. The fuel comprises stacks of annular compacts that line the fuel containing bores and define central coolant flow channels through the fuel. The block provides support to the annular compacts.

U.S. Pat. Nos. 3,891,502, 3,988,397, and 4,017,567 disclose block fuel elements formed from graphite matrix.

Although the above patents disclose a variety of fuel elements, the solid blocks disclosed all provide for separate coolant channels and fuel-containing channels whereby heat generated by the fuel is removed from the blocks and the coolant does not have direct contact with the fuel itself. This results in increased fuel element, core, and reactor size. There exists a need for gas cooled fuel elements that are smaller in size than current fuel elements but are capable of producing the same amount of power.

SUMMARY OF THE INVENTION

The present invention addresses the above need in a straightforward manner. What is provided is a gas cooled nuclear fuel element that provides for direct contact of the coolant with the fuel bearing material. A plurality of fuel-bearing disks are stacked together and supported within a cylindrical tube by end fittings. The cylindrical tube provides a coolant flow path outside of the disk stack, provides structural rigidity, and separates the coolant and fuel compacts from any neutron moderator used. The disk compacts can be manufactured for radial or axial coolant flow.

BRIEF DESCRIPTION OF THE DRAWINGS

For a further understanding of the nature and objects of the present invention, reference should be had to the following description taken in conjunction with the accompanying drawings in which like parts are given like reference numerals, and wherein.

DETAILED DESCRIPTION OF THE PREFERRED EMBODIMENT

Figure 1:
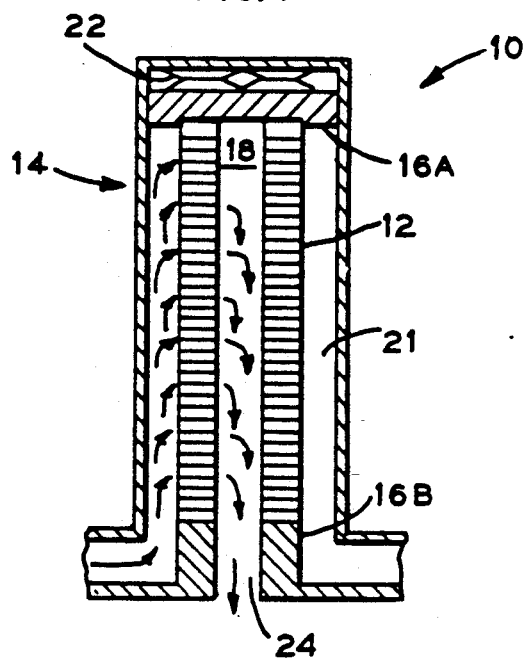
FIG. 1 is a side sectional view of the invention.

Referring to the drawings, it is seen in FIG. 1 that the invention is generally indicated by the numeral 10. Gas cooled nuclear fuel element 10 is generally comprised of a plurality of individual disks 12, cylindrical tube 14, and end fittings 16.

Figure 3:
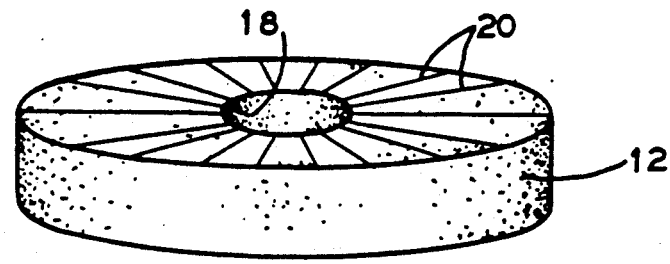
FIG. 3 illustrates a single disk from the disk stack of the invention.

Each disk 12 preferably utilizes a matrix material such as carbon to bind nuclear fuel particles into a disk shape such as that illustrated. During the manufacturing process flow channels are incorporated according to the desired path of coolant flow through the disks. In the preferred embodiment seen in FIG. 1 and 3, a single axial channel 18 is provided through substantially the center of each disk 12. Each disk 12 is also provided with a plurality of small radial channels or grooves 20 that extend from the outer edge of disk 12 to axial channel 18. Grooves 20 may be provided on either the upper or lower faces of each disk or on both faces. When the disks are stacked upon each other as seen in FIG. 1, grooves 20 provide a path for coolant flow radially across the disks to axial channel 18.

The stack of disks is positioned inside cylindrical tube 18 and held in place by upper and lower end fittings 16A,B so as to define an annular space 21 between disks 12 and cylindrical tube 18. Cylindrical tube 18 is preferably closed at its upper end and open at its lower end. Spring 22 is positioned between upper end fitting 16A and the top end of cylindrical tube 14. This allows for axial expansion of disks 12 during reactor operations. Upper end fitting 16A may also be provided with a recessed central area for receiving the upper disk 12 to provide lateral support and prevent sideways movement of the disks. Lower end fitting 16B has substantially the same outer diameter as disks 12. Lower end fitting 16B is provided with central bore 24 therethrough.

Figure 5:
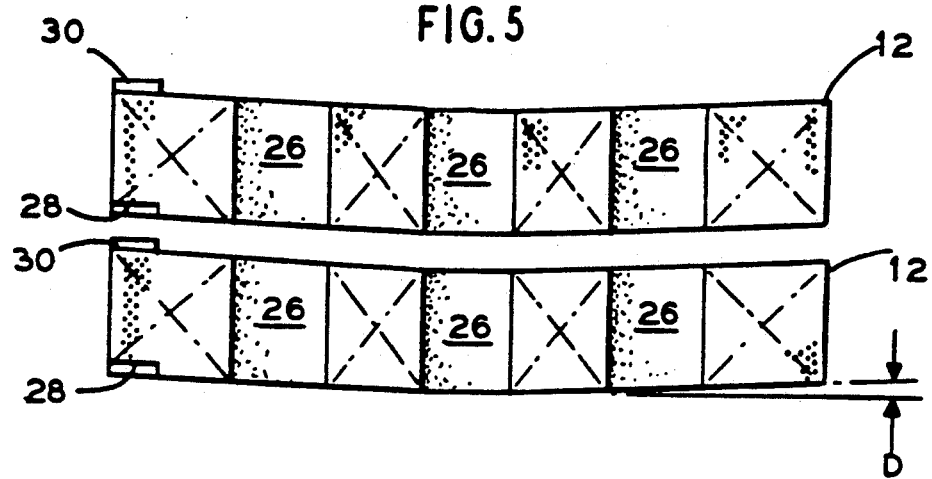
FIG. 5 is a side view that illustrates the locking fit of the disks of the invention.
Figure 4:
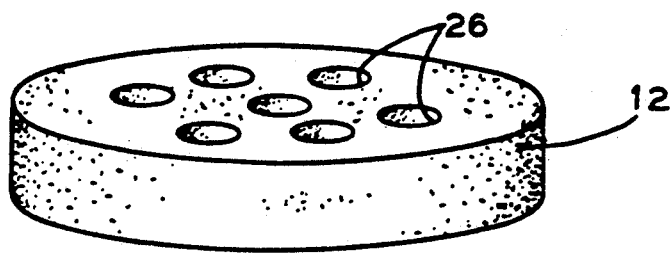
FIG. 4 illustrates an alternate embodiment of a single disk of the invention.

An alternate embodiment of disks 12 is illustrated in FIG. 4, 5 where a plurality of axial bores 26 are provided for coolant flow. This eliminates the need for grooves 20 due to the increased surface area of disks 12 in contact with coolant flow and allows for the use of only axial coolant flow through disks 12. As seen in FIG. 5, either embodiment of disks 12 may also be provided with features that cause disks 12 to remain in proper position relative to each other. The bottom face of each disk 12 may be provided with a notch 28 adjacent its outer edge. A tab 30 that corresponds in size to notch 28 may be provided on the upper face of each disk 12. During stacking of disks 12, tab 30 is received within notch 28 of a adjacent disk. This prevents rotation of disks 12 relative to each other and maintains proper alignment of axial bores 26. Another feature that may be utilized for either embodiment is to shape each of disks 12 such that its upper face is concave and its lower face is convex to the same degree as the concave upper face. This is indicated by dimension D in FIG. 5. The mating of concave and convex surfaces when disks 12 are stacked provides lateral support and prevents sliding of disks 12 relative to each other.

Figure 2:
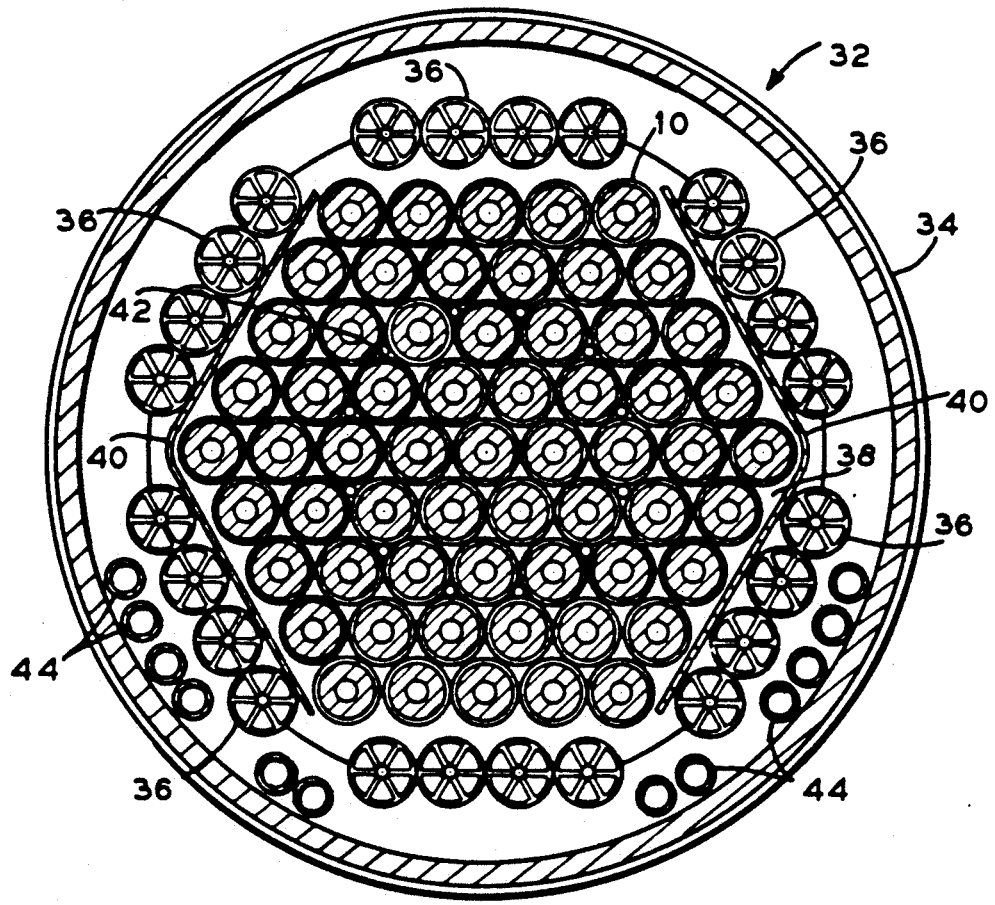
FIG. 2 is a plan view illustrating the invention in a nuclear reactor vessel.

A plurality of gas cooled nuclear fuel elements 10 are used in a gas cooled nuclear reactor 32 such as that illustrated in FIG. 2. Reactor 32 is formed from reactor vessel 34, control drums 36, moderator 38, flow baffles 40, gas cooled nuclear fuel elements 10, control rods 42, and cooling tubes 44. For ease of illustration, only a small number of cooling tubes 44 are shown and it should be understood that more cooling tubes 44 may be used.

In operation, coolant is directed through reactor vessel 34 to gas cooled fuel nuclear fuel elements 10 for heat removal from the fuel elements. As indicated by the arrows in FIG. 1, coolant enters the annular space 21 between the stack of fuel disks 12 and the interior wall of cylindrical tube 14, flows radially between fuel disks 12 through grooves 20 into axial channel 18, and then downward through axial channel 18 and central bore 24 in lower end fitting 16B. The coolant is then directed to a power conversion device that converts the heat into useful energy. The following advantages are provided by gas cooled nuclear fuel element 10. High volume loadings of coated fuel particles may be obtained in disks 12 due to the need for little excess matrix material to form the disk and obtain the necessary rigidity. This reduces fuel element size and overall core size. The separation of the fuel from the moderator, as opposed to the known art that incorporates the moderator into the fuel elements, also separates the moderator from the reactor coolant. This allows the use of relatively low temperature, hydrogenous moderators that are more volume efficient than carbon or graphite and results in a reduction of reactor volume. Another advantage of the separation of moderator and coolant is that it provides an independent residual heat removal mechanism to cool the reactor in the event that normal coolant flow is lost. The simple shape of disks 12 allow them to be formed from high temperature refractory materials such as graphitized carbon with rounded corners to intensify resistance to mechanical and thermal stresses, thus increasing the resilience of the fuel form to conditions that would normally induce high stresses. This is further enhanced by the additional structural support provided by cylindrical tube 14. The simple geometry of disks 12 allows the use of common manufacturing techniques while minimizing the potential for damage to coated fuel particles within disk 12 because stress upon the fuel particles can be kept very low during manufacturing.

Figure 6:
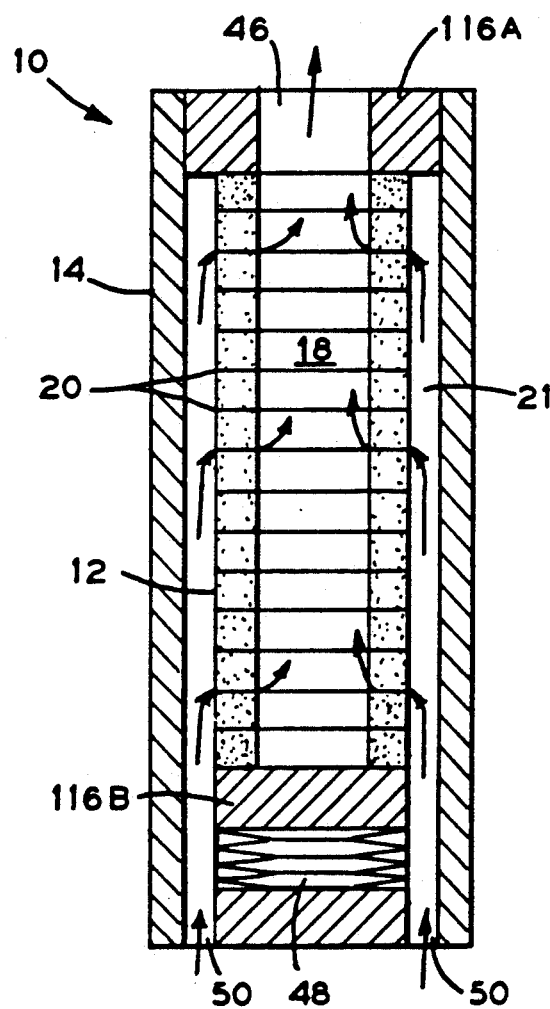
FIG. 6 illustrates an alternate embodiment of the invention.

FIG. 6 illustrates an alternate embodiment of gas cooled nuclear fuel element 10 wherein cylindrical tube 14 is open at both ends. The stack of nuclear fuel disks 12 is designed for radial flow by the use of grooves 20 as described above whereby the coolant flows radially between disks and then axially out the stack through axial channel 18. However, in this embodiment the coolant flows into gas cooled nuclear fuel element 10 at one end and out of fuel element 10 at the opposite end. This is accomplished in the following manner. Upper end fitting 116A is nonporous and provided with axial bore 46 that is in coaxial alignment with axial channels 18 of the stack of fuel disks 12. Lower end fitting 116B is provided with means 48 to allow axial expansion of fuel disks 12 during reactor operations. Means 48 may be formed from a spring or bellows. As indicated by the arrows, coolant flows into axial channel 21 through opening 50 at the lower end of cylindrical tube 14. The coolant is then forced to flow radially across fuel disks 12 through grooves 20 into axial channel 18 and then axially out of fuel element 10 through axial bore 46.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:
1. A gas cooled nuclear fuel element, comprising:
   a. a cylindrical tube having one open end;
   b. a plurality of nonporous nuclear fuel disks stacked inside said cylindrical tube so as to define an annular space between said disks and said tube;
   c. said nuclear fuel disks each having an axial channel therethrough and grooves to provide a path for coolant flow on a surface of each disk that extend radially between said axial channel and the outer edge of said disks; and
   d. an upper and a lower end fitting in said cylindrical tube that support said nuclear fuel disks in said tube, said lower end fitting having a central bore in coaxial alignment with the axial channel in said fuel disks.

2. The nuclear fuel element of claim 1, wherein each of said fuel disks has an upper concave surface and a lower convex surface.

3. A gas cooled nuclear fuel element, comprising:
   a. a cylindrical tube having both ends open;
   b. a plurality of nonporous nuclear fuel disks stacked inside said cylindrical tube so as to define an annular space between said disks and said tube;
   c. said nuclear fuel disks each having an axial channel therethrough and grooves to provide a path for coolant flow on a surface of each disk that extend radially between said axial channel and the outer edge of said disks;
   d. an upper and a lower end fitting in said cylindrical tube that support said nuclear fuel disks in said tube, said upper end fitting having an axial bore in coaxial alignment with the axial channels in said stack of nuclear fuel disks.

4. The nuclear fuel element of claim 3, wherein each of said fuel disks has an upper concave surface and a lower convex surface.

* * * * *